(12) United States Patent
Li et al.

(10) Patent No.: US 11,111,588 B2
(45) Date of Patent: Sep. 7, 2021

(54) ELECTROLYTIC REACTOR OF OXYHYDROGEN MACHINE

(71) Applicant: Shenzhen Qianhai Yindun Energy Saving Environmental Protection Industry Development Co., Ltd., Shenzhen (CN)

(72) Inventors: Xin Li, Guangdong (CN); Hung Yueh Lo, Taichung (TW); Yu Hua Chu, Taoyuan (TW)

(73) Assignee: SHENZHEN QIANHAI YINDUN ENERGY SAVING ENVR. PROT., Shenzhen (CN)

( * ) Notice: Subject to any disclaimer, the term of this patent is extended or adjusted under 35 U.S.C. 154(b) by 41 days.

(21) Appl. No.: 16/515,702

(22) Filed: Jul. 18, 2019

(65) Prior Publication Data

US 2021/0017658 A1 Jan. 21, 2021

(51) Int. Cl.

| | |
|---|---|
| *C25B 1/04* | (2021.01) |
| *C25B 11/02* | (2021.01) |
| *C25B 9/60* | (2021.01) |
| *C25B 9/13* | (2021.01) |
| *C25B 15/02* | (2021.01) |
| *C25B 15/04* | (2006.01) |
| *C25B 1/02* | (2006.01) |
| *C25B 9/63* | (2021.01) |
| *C25B 15/08* | (2006.01) |

(52) U.S. Cl.
CPC .............. *C25B 15/02* (2013.01); *C25B 1/02* (2013.01); *C25B 1/04* (2013.01); *C25B 9/13* (2021.01); *C25B 9/60* (2021.01); *C25B 9/63* (2021.01); *C25B 11/02* (2013.01); *C25B 15/04* (2013.01); *C25B 15/08* (2013.01)

(58) Field of Classification Search
None
See application file for complete search history.

(56) References Cited

U.S. PATENT DOCUMENTS

| | | | | |
|---|---|---|---|---|
| 3,310,483 A | * | 3/1967 | Rhodes ..................... | C25B 9/18 204/268 |
| 4,344,831 A | * | 8/1982 | Weber ....................... | C25B 9/06 123/3 |
| 5,614,069 A | * | 3/1997 | Lin ........................... | C25B 9/06 204/268 |

(Continued)

*Primary Examiner* — Harry D Wilkins, III
(74) *Attorney, Agent, or Firm* — Guice Patents PLLC

(57) ABSTRACT

An electrolytic reactor of an oxyhydrogen machine includes a main body with an internal chamber for accommodating a liquid, a carrier installed to the chamber for arranging even numbered electrode plates which are spaced from each other and two adjacent electrode plates having different polarities, a multiple of partitions extending to an appropriate length from the top surface to the bottom surface of the main body and spaced from each other, a communicating channel formed by each electrode plate and the main body and disposed between the bottom surface of the main body and each electrode plate, a liquid storage portion formed by the space between the partitions and the chamber and communicated to the communicating channel and a gas extraction unit installed on the main body and having independent first and second gas collection chambers for collecting hydrogen and oxygen respectively.

12 Claims, 9 Drawing Sheets

(56) References Cited

U.S. PATENT DOCUMENTS

| | | | |
|---|---|---|---|
| 5,733,422 A * | 3/1998 | Lin | C25B 9/08 204/228.2 |
| 2004/0074781 A1* | 4/2004 | Klein | C25B 9/06 205/628 |
| 2008/0283392 A1* | 11/2008 | Karabin | C25B 9/18 204/258 |
| 2010/0089746 A1* | 4/2010 | Chang | C25B 11/12 204/269 |
| 2017/0247800 A1* | 8/2017 | Lacroix | C25B 9/73 |

* cited by examiner

ELECTROLYTIC REACTOR OF OXYHYDROGEN MACHINE

FIELD OF THE INVENTION

The present invention relates to the structure of an oxyhydrogen machine, and more particularly to an electrolytic cell and gas extraction structure of the oxyhydrogen machine.

BACKGROUND OF THE INVENTION

As science and technology advance continuously, the demand for energy becomes increasingly higher and more urgent. Green energy such as solar energy, wind energy and chemical energy becomes a main subject of research and development, and it is our primary goal to obtain a low-cost energy from the nature and convert such energy into electric energy effectively. Therefore, an oxyhydrogen machine used for generating hydrogen used as a fuel for engines or fuel cells is a cost-effective source of green energy.

With reference to FIG. 9 for an electrolytic cell gas extraction structure of a conventional oxyhydrogen machine, the structure comprises a main body (90), an anode plate (91) and a cathode plate (92), wherein the main body (90) is hollow and has a plate member (901) transversally installed therein, so that the interior of the main body (90) is divided into a liquid chamber (902) and a gas chamber (903) disposed above the liquid chamber (902) and has a partition plate (905) configured to be perpendicular to the plate member (901) and disposed inside the main body (90), so that the gas chamber (903) can be divided into an oxygen chamber (906) and a hydrogen chamber (907) which are not communicated to each other, and the liquid chamber (902) is divided into an anode chamber (908) having the anode plate (91) and a cathode chamber (909) having the cathode plate (92) which are partially communicated to each other, and the plate member (901) has an oxygen hole (911) communicating to the anode chamber (908) and a hydrogen hole (921) communicating to the cathode chamber (909), so that after the electrolysis, oxygen and hydrogen can flow into the oxygen chamber (906) and the hydrogen chamber (907) through the oxygen hole (911) and the hydrogen hole (921) respectively for gas collection. Further, an air vent (910) is formed at the top of the oxygen chamber (906) and the hydrogen chamber (907), but the performance of such oxyhydrogen machine is still not up to user satisfaction. For example, being unable to balance the hydrogen and oxygen content in the liquid and reduce the reaction efficiency, the separation/collection of hydrogen and oxygen is poor, and the pressure inside/outside the oxyhydrogen machine cannot be balanced easily, and a good turbulence of liquid cannot be achieved, and the reaction efficiency is affected adversely. In view of the aforementioned drawbacks, the inventor of the present invention based on years of experience in the related industry to conduct extensive research and experiment, and finally provided a feasible solution as disclosed in this invention to overcome the aforementioned drawbacks.

SUMMARY OF THE INVENTION

Therefore, it is a primary objective of the present invention to overcome the aforementioned drawbacks of the prior art by providing an electrolytic reactor of an oxyhydrogen machine capable of improving the reaction efficiency of electrolysis.

Another objective of the present invention is to provide an electrolytic reactor of an oxyhydrogen machine capable of lowering the production and manufacturing costs.

To achieve the aforementioned and other objectives, the present invention discloses an electrolytic reactor of an oxyhydrogen machine comprising a main body, a carrier, a series of partitions, a communicating channel, a liquid storage portion and a gas extraction unit, characterized in that the main body has an internal chamber for accommodating a liquid, and the carrier is installed on an inner side of the bottom surface of the main body and disposed at the chamber for installing a series of even numbered electrode plates which are arranged with an interval apart from each other, and two adjacent electrode plates have different polarities; the series of partitions is extended to an appropriate length in a direction from an inner side of the top surface of the main body to the bottom surface of the main body and arranged with an interval apart from each other, and each partition corresponds and neighbors to each electrode plate respectively; the communicating channel is formed by incompletely abutting a side of each electrode plate against an inner side of the bottom surface of the main body and disposed between an inner side of the bottom surface of the main body and each electrode plate; the liquid storage portion is formed by the space between a side of the series of partitions and a side of the chamber and communicates to the communicating channel; the gas extraction unit is installed on an outer side of the top surface of the main body and includes an independent first gas collection chamber and an independent second gas collection chamber for collecting hydrogen and oxygen respectively.

The technical contents of the present invention will become apparent with the detailed description of preferred embodiments accompanied with the illustration of related drawings as follows. It is intended that the embodiments and figures disclosed herein are to be considered illustrative rather than restrictive.

DESCRIPTION OF THE PREFERRED EMBODIMENTS

Figure 1:
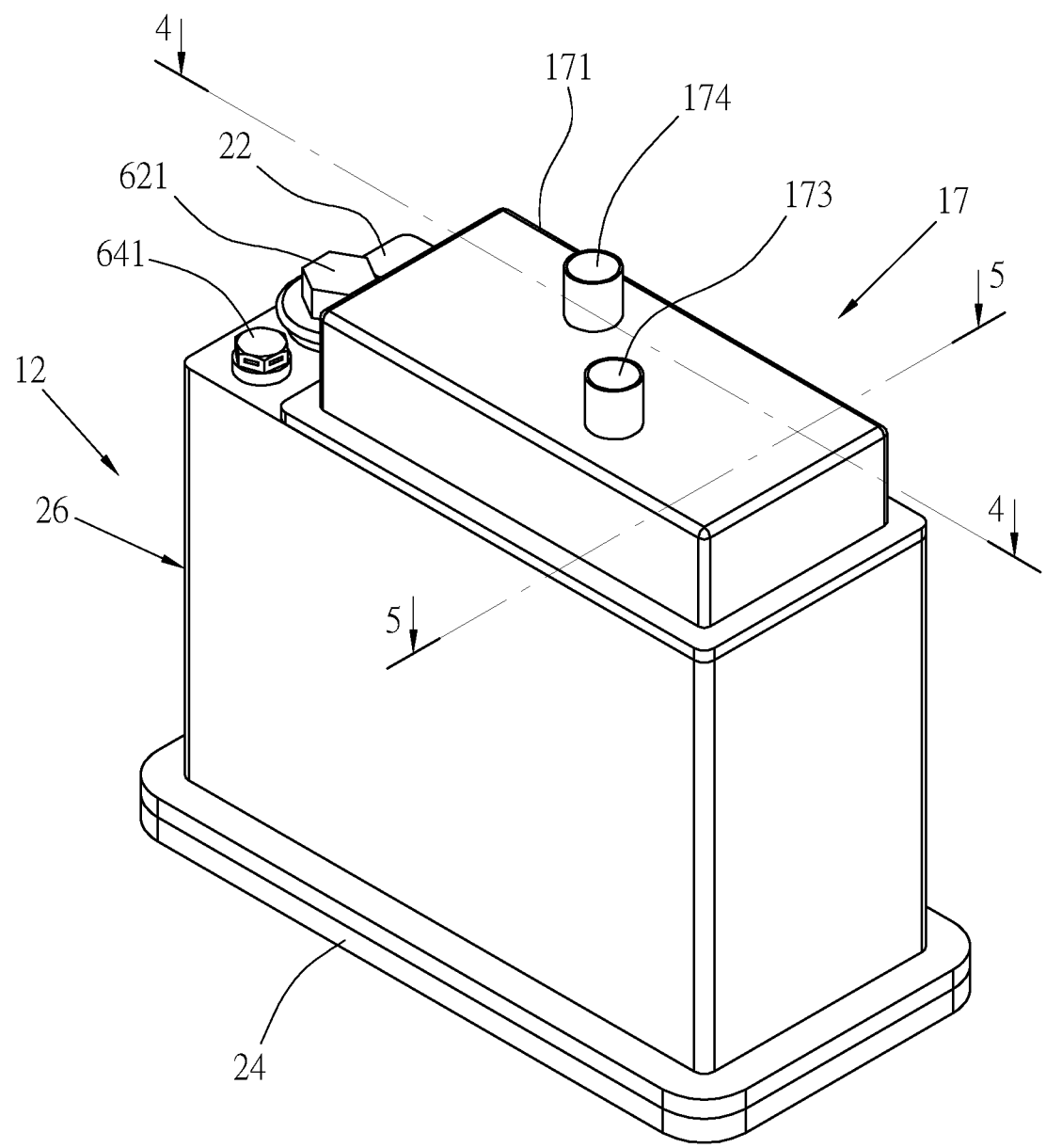
FIG. 1 is a perspective view of a preferred embodiment of the present invention.

With reference to FIGS. 1 to 5 for an electrolytic reactor of an oxyhydrogen machine in accordance with the first embodiment of the present invention, the electrolytic reactor of the oxyhydrogen machine comprises a main body (12), a carrier (13), a series of partitions (14), a communicating channel (15), a liquid storage portion (16) and a gas extraction unit (17).

The main body (12) is formed by enclosing a top surface (22), a bottom surface (24) and a lateral surface (26) and has an internal chamber (28) for accommodating a liquid such as water or an aqueous solution containing an electrolyte such as NaOH, KOH, $Na_2SO_4$, $K_2SO_4$ or $H_2SO_4$.

The carrier (13) is installed on an inner side of the bottom surface (24) and disposed at the chamber (28) for installing a series of electrode plates (32) which are arranged with an interval apart from each other and extended in a direction from a side of the chamber (28) to the other side of the chamber (28), and the electrode plates (32) are preferably arranged equidistantly, and each electrode plate (32) includes even-numbered cathode plates and even-numbered anode plates, and two adjacent electrode plates have different polarities. In the first embodiment as shown in the figure, the electrode plates (32) (arranged equidistantly and sequentially from left to right) have the polarities +−+− respectively to provide better electrolysis efficiency. Of course, the present invention may adopt 6, 8, or more (even numbered) electrode plates (32) (arranged equidistantly and sequentially from left to right) having the polarities +−+−+− or +−+−+−+− to produce more gas by a better electrolysis.

The quantity of partitions (14) is equal to the quantity of the electrode plates (32), and the partitions (14) are disposed at an inner side of the top surface (22) and extended a predetermined length in a direction from the inner side of the top surface (22) to the bottom surface (24) and arranged with an interval apart from each other in a direction from a side of the chamber (28) to the other side of the chamber (28), and the partitions (14) are preferably arranged equidistantly, wherein each partition (14) corresponds and neighbors to each electrode plate (32), so that each electrode plate (32) has an independent space and the interior of the chamber (28) is a communicating space provided for collecting the gas generated from the electrolysis of each electrode plate (32) more efficiently. Wherein, the predetermined length of the series of partitions (14) is defined as a distance between an outer end of each partition (14) and the bottom surface (24) subtracted from a distance that the inner side of the top surface (22) is spaced apart from the bottom surface (24).

The communicating channel (15) is formed by incompletely abutting a side of each electrode plate (32) against an inner side of the bottom surface (24) and disposed between an inner side of the bottom surface (24) and each electrode plate (32). In this embodiment, at least one depression or an opening is formed at an end of each electrode plate (32), so that a channel is formed between each electrode plate (32) and the bottom surface (24), and the communicating channel (15) is provided for providing not-yet reacted or not-yet completely reacted liquid to each electrode plate (32) to carry out a better electrolysis reaction. Please refer to FIG. 5. Two corners are missing from an outer end of each electrode plate (32) being adjacent to the bottom surface (24) for forming the communicating channel (15).

The liquid storage portion (16) is formed by the space between a side of the series of partitions (14) and a side of the chamber (28) and communicates to the communicating channel (15) for accommodating the liquid.

The gas extraction unit (17) includes a first opening (72), a second opening (74), a first collection portion (76) and a second collection portion (78), and the first opening (72) corresponds to an independent space of each cathode plate and disposed at the top surface (22), the second opening (74) corresponds to an independent space of each anode plate and disposed on the top surface (22), and the first collection portion (76) is disposed on an outer side of the top surface (22) and communicated to each first opening (72) for collecting hydrogen gas generated by each cathode plate, and the second collection portion (78) is disposed on an outer side of the top surface (22) and communicated to each second opening (74) for collecting oxygen gas generated by each anode plate.

The first collection portion (76) and the second collection portion (78) of the gas extraction unit (17) is formed by a cover (171), a partition plate (172), a first collection hole (173) and a second collection hole (174); the cover (171) has an opening (1711) covering onto an outer side of the top surface (22); the partition plate (172) is installed in the cover (171) and provided for forming a first gas collection chamber (1712) and a second gas collection chamber (1713) which are not communicated to each other, wherein the first gas collection chamber (1712) corresponds to each first opening (72), and the second gas collection chamber (1713) corresponds to each second opening (74); the first collection hole (173) penetrates through a lateral surface of the cover (171) and corresponds to the first gas collection chamber (1712); and the second collection hole (174) penetrates through a lateral surface of the cover (171) and corresponds to the second gas collection chamber (1713).

In addition, the first collection portion (76) and the second collection portion (78) of the gas extraction unit (17) may adopt three-way pipelines respectively (not shown in the figure) used for achieving the effect of collecting gas.

With reference to FIGS. 1 to 4 for the second embodiment of the present invention, this embodiment further comprises an injection port (62) configured to be corresponsive to the liquid storage portion (16) and disposed on the top surface (22) for adding the liquid conveniently, wherein the present invention further comprises a bolt (621) used for opening and closing the injection port (62).

Figure 2:
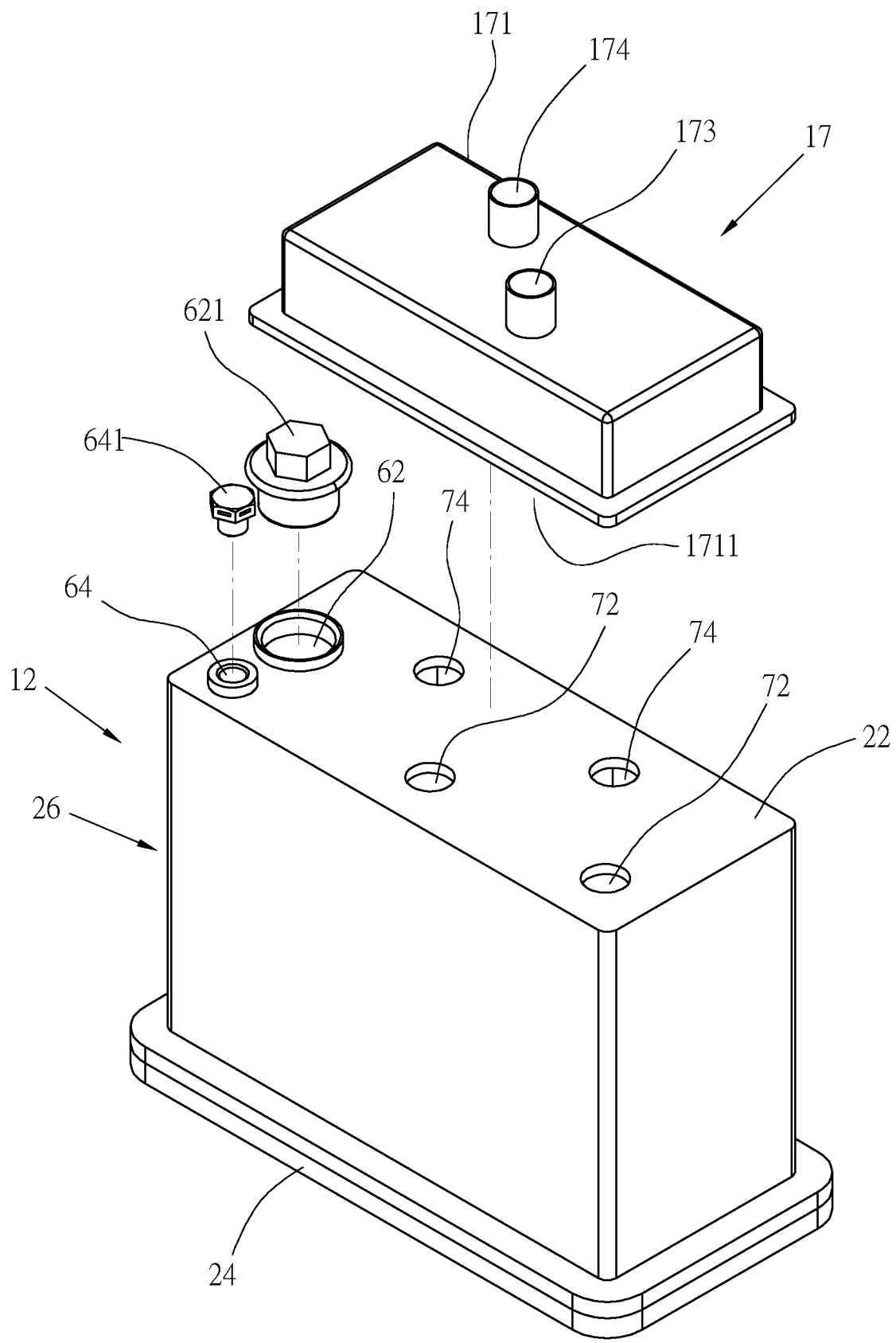
FIG. 2 is a partial exploded view of a preferred embodiment of the present invention.
Figure 3:
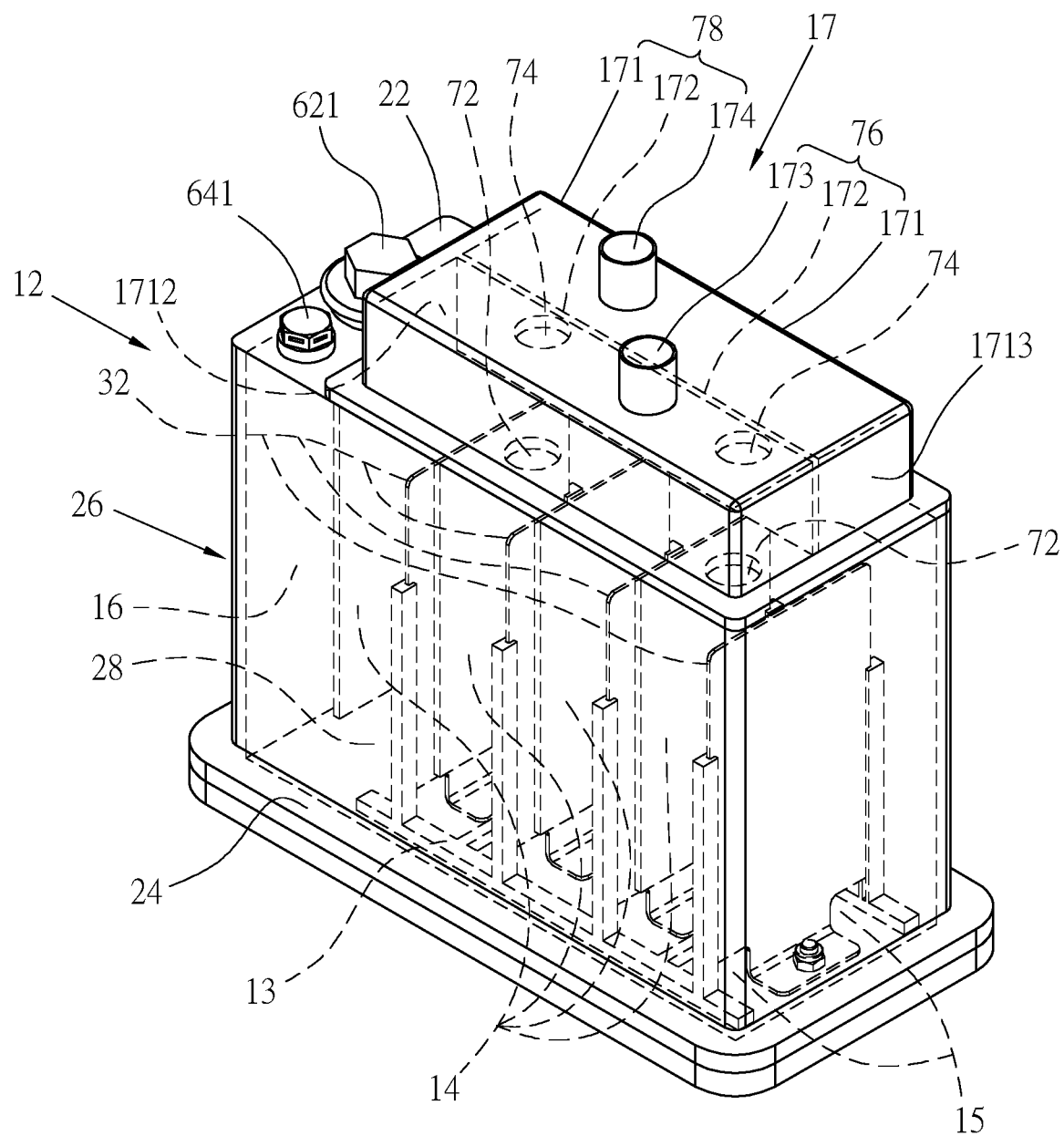
FIG. 3 is a structural perspective view of a preferred embodiment of the present invention.
Figure 4:
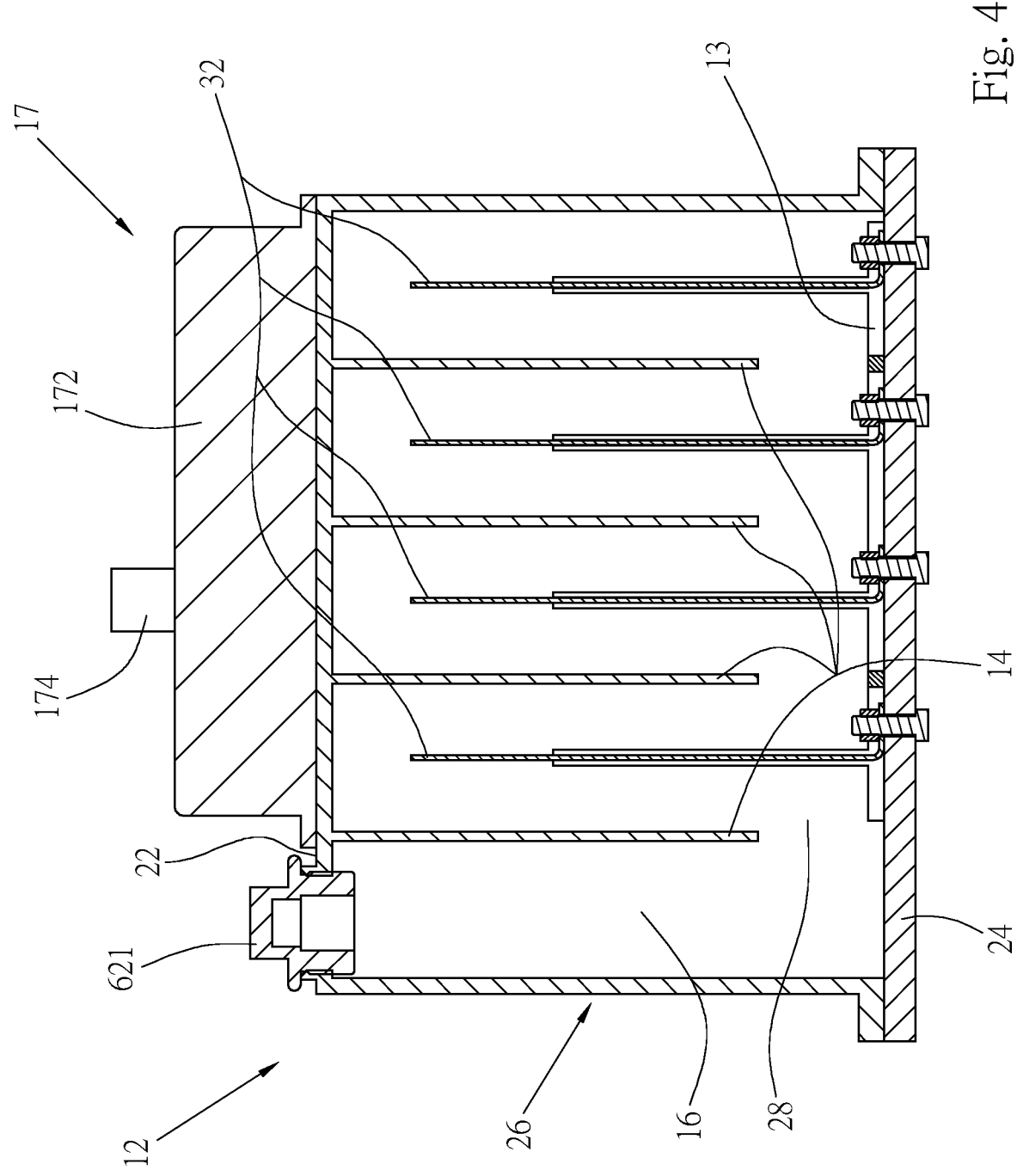
FIG. 4 is a cross-sectional view of Section 4-4 of FIG. 1.
Figure 5:
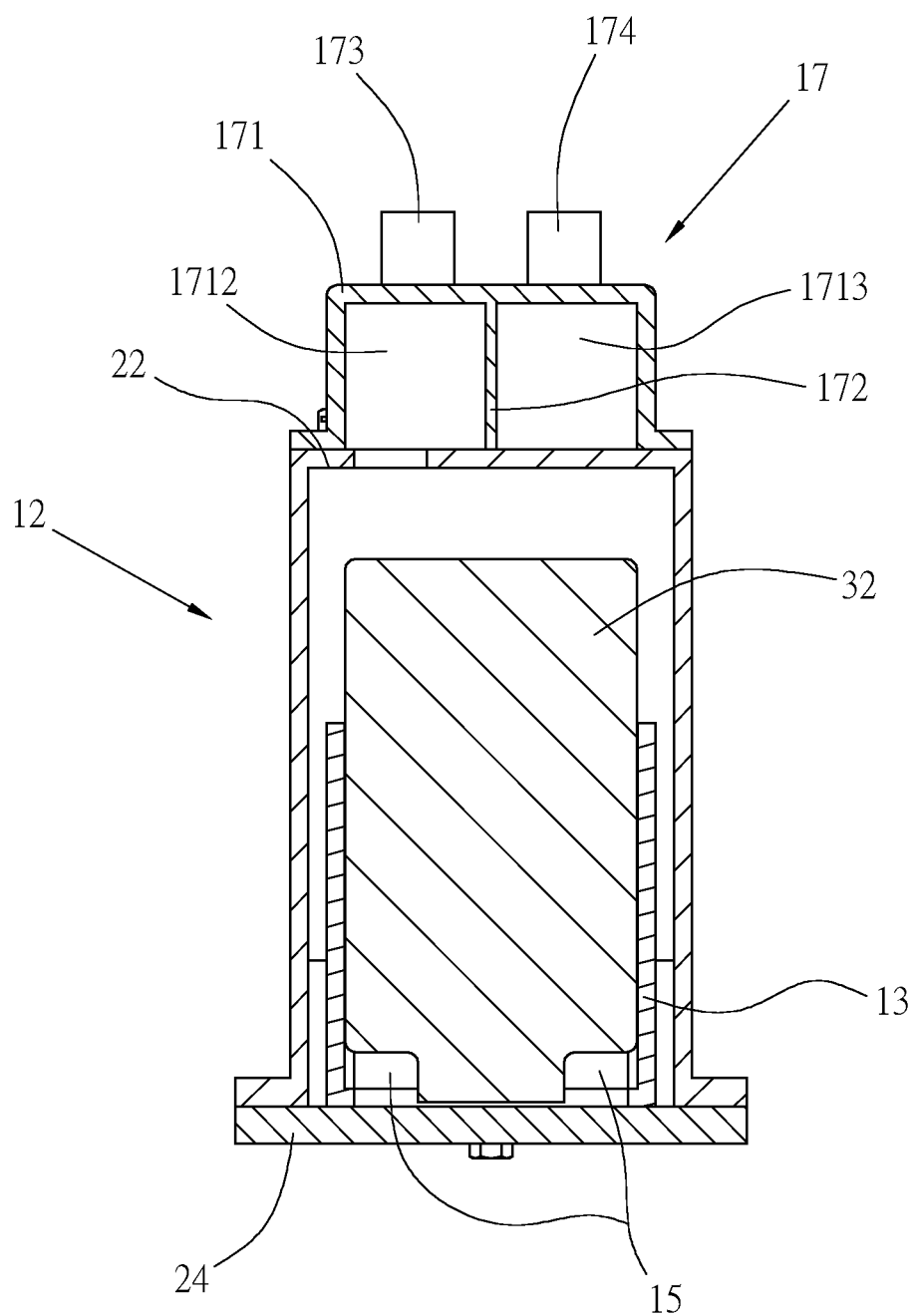
FIG. 5 is a cross-sectional view of Section 5-5 of FIG. 1.

With reference to FIGS. 1 to 3 for the third embodiment of the present invention, this embodiment further comprises a venting hole (64) configured to be corresponsive to the liquid storage portion (16) and disposed on the top surface (22) for adding the liquid more smoothly, wherein the present invention further comprises a bolt (641) for incompletely sealing the venting hole (64).

Figure 6:
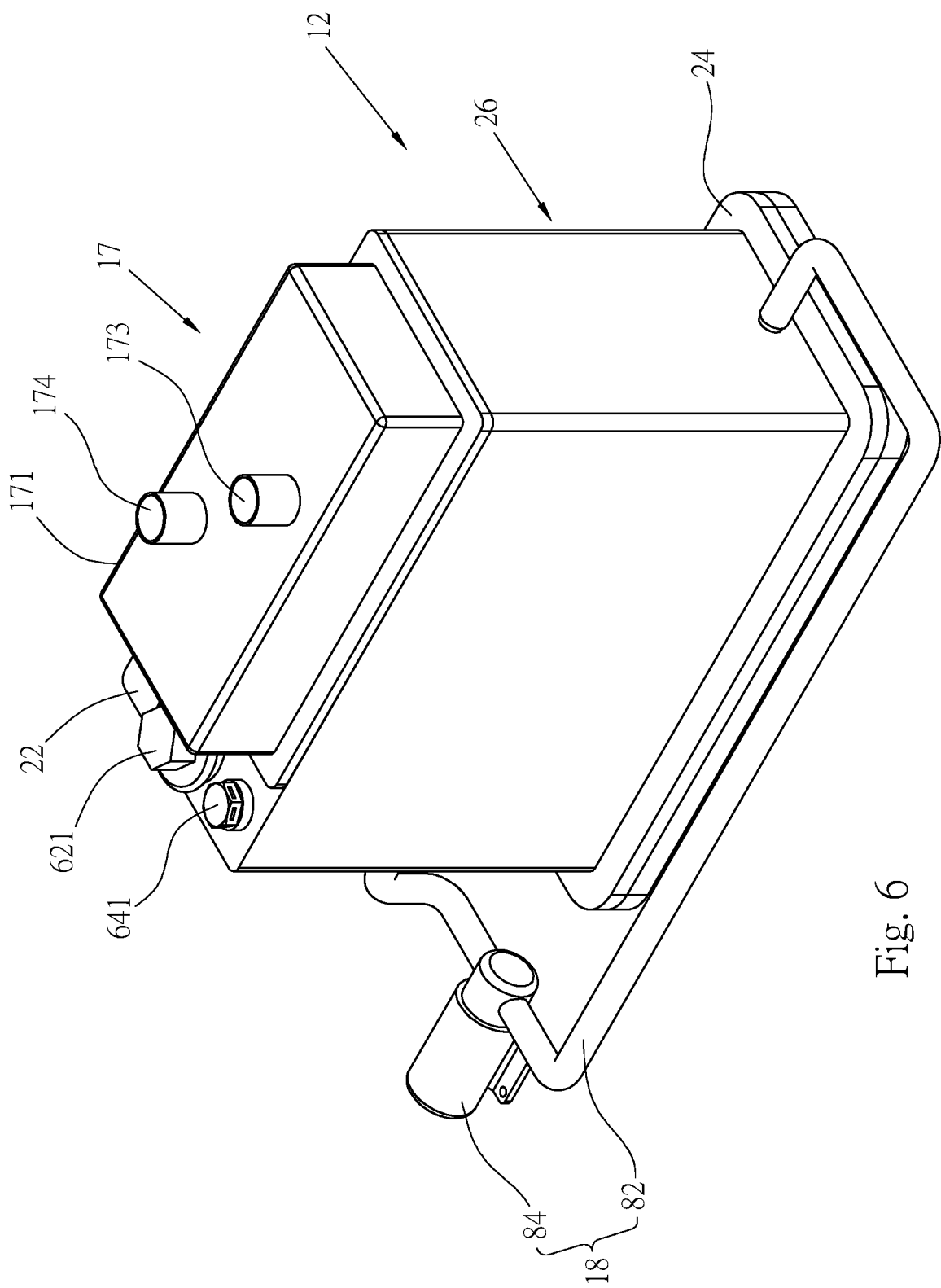
FIG. 6 is a perspective view showing the appearance of a preferred embodiment of the present invention carrying a return pipeline system.
Figure 7:
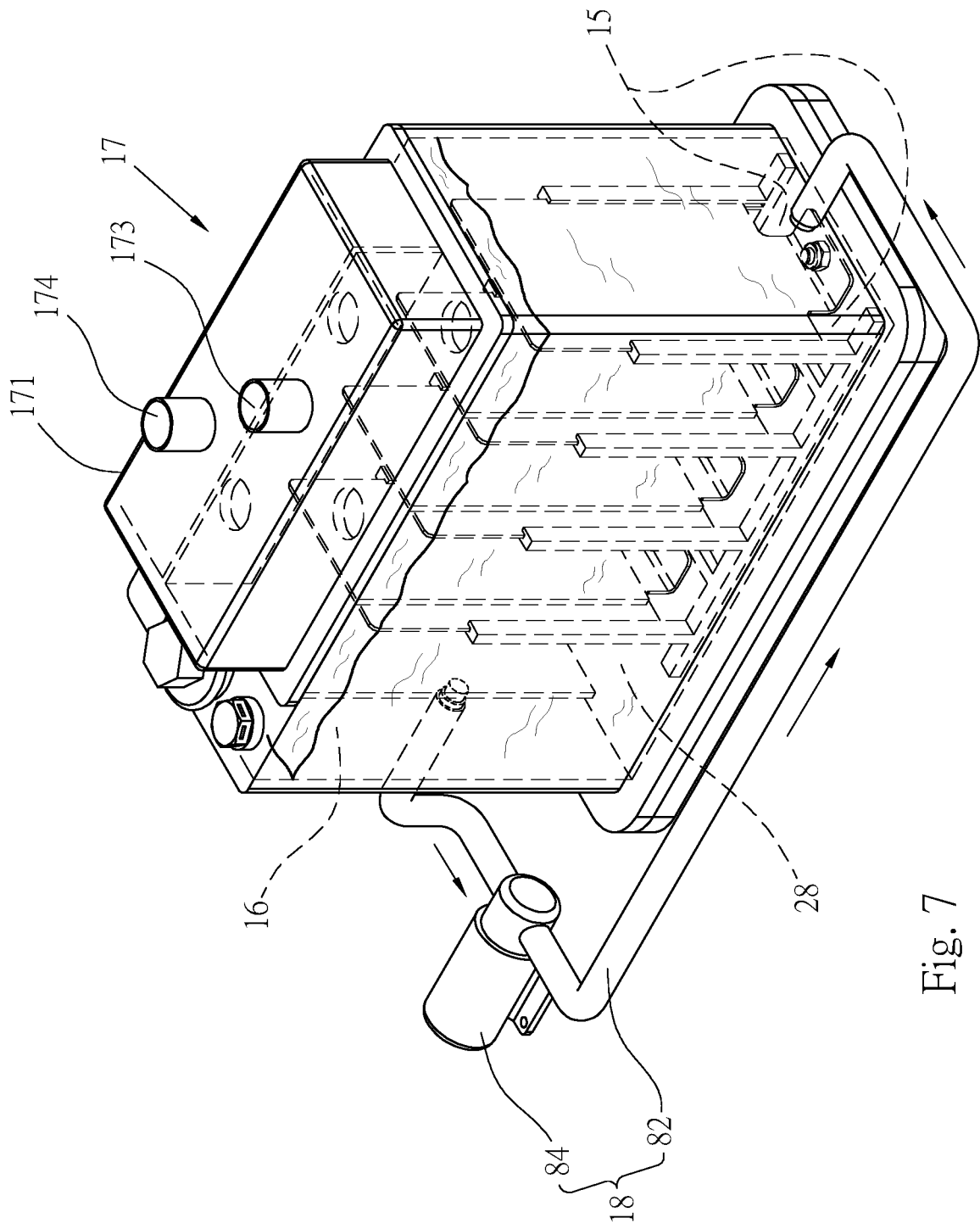
FIG. 7 is a perspective view showing the structure of a preferred embodiment of the present invention carrying the return pipeline system.

With reference to FIGS. 6 and 7 for the fourth embodiment of the present invention, this embodiment further comprises a return pipeline system (18) installed on an outer side of the main body (12), and the return pipeline system (18) comprises a fluid pipeline (82) and a pump (84), and the fluid pipeline (82) has an end communicating with the liquid storage portion (16) and the other end corresponding to an end of the communicating channel (15) and communicating with a side of the chamber (28), and the pump (84) is installed at the fluid pipeline (82), and the pump (84) is set to be a one-way delivering pump and provided for pumping a liquid of the liquid storage portion (16) into the communicating channel (15) through the fluid pipeline, so that the liquid can flow out from an end of the communicating channel (15) of the liquid storage portion (16) and into the other end of the communicating channel (15), so as to improve the turbulence effect and achieve a better electrolytic reaction efficiency.

In an electrolysis reaction, the present invention with the aforementioned structure and the design of the series of partitions (14) and the gas extraction unit (17) can separate hydrogen and oxygen better; the spatial and structural design of the liquid storage portion (16) can maintain the hydrogen and oxygen contents of the liquid balanced instantly to improve the electrolysis efficiency; the design of the venting hole (64) can balance the internal and external pressures of the main body (12) to provide better safety; the spatial and structural design of the return pipeline system (18) can increase the turbulence effect to give better electrolytic reaction efficiency.

Figure 8:
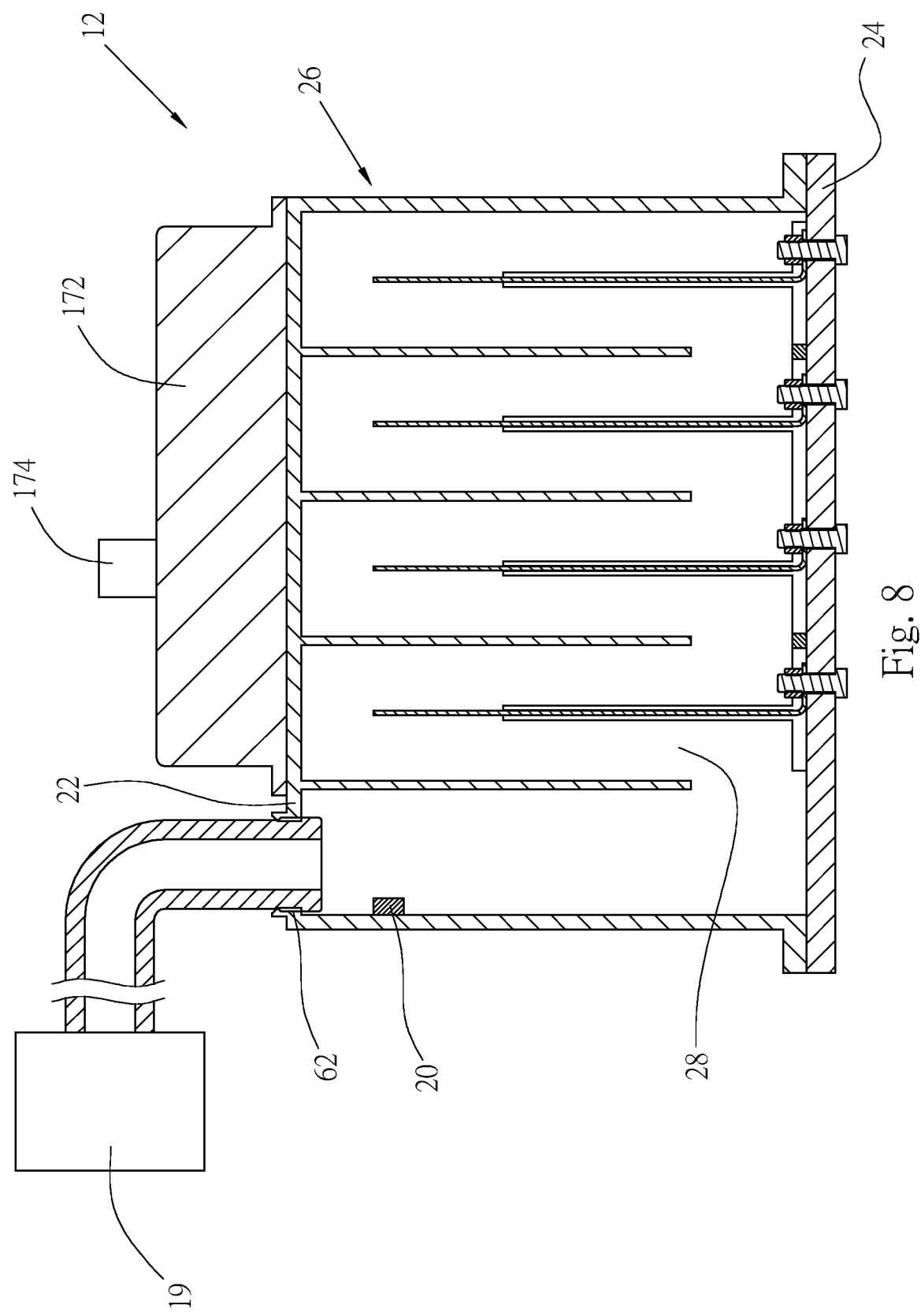
FIG. 8 is a cross-sectional view of a preferred embodiment of the present invention carrying a liquid resupply mechanism and a sensing unit.
Figure 9:
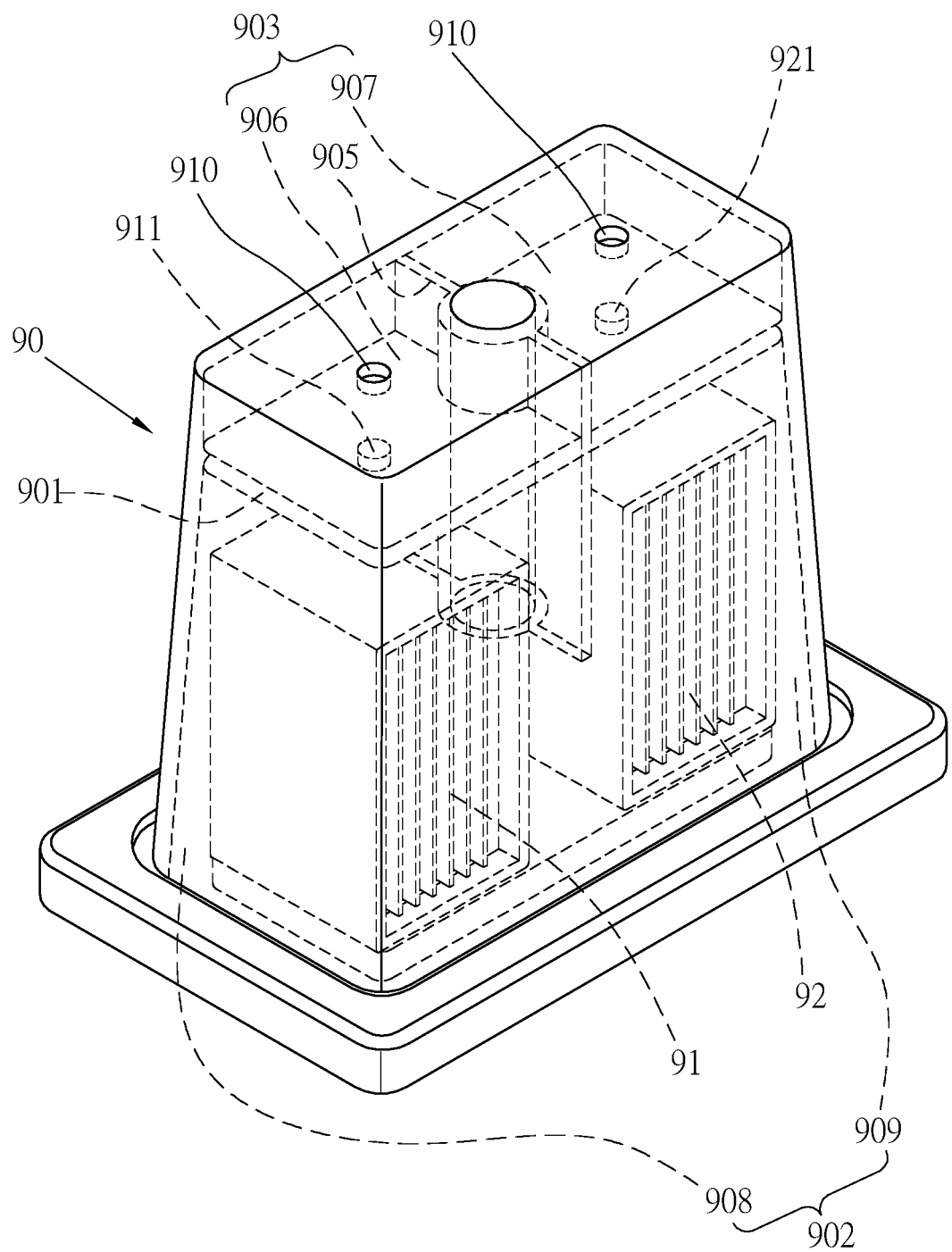
FIG. 9 is a perspective view showing an "electrolytic cell and gas extraction structure" of a conventional oxyhydrogen machine.

With reference to FIG. 8 for the fifth embodiment of the present invention, this embodiment further comprises a liquid resupply mechanism (19) and a sensing unit (20), and the liquid resupply mechanism (19) has a side communicating with the injection port (62) for providing the liquid, and the sensing unit (20) is installed at the liquid storage portion (16) of the chamber (28) and electrically coupled to the liquid resupply mechanism (19) for sensing the liquid level to transmit a message to the liquid resupply mechanism (19) in order to perform the action of adding the liquid into the chamber (28) or not adding the liquid into the chamber (28).

While the present invention has been described by means of specific embodiments, numerous modifications and variations could be made thereto by those skilled in the art without departing from the scope and spirit of the present invention set forth in the claims.

What is claimed is:

1. An electrolytic reactor of an oxyhydrogen machine, comprising:
    a main body, including a top surface, a bottom surface and a lateral surface which are enclosed to form the main body with an internal chamber for accommodating a liquid;
    a carrier, installed on an inner side of the bottom surface and disposed at the chamber, carrying a series of electrode plates arranged with an interval apart from each other in a direction from one side of the chamber to the other side of the chamber, and the series of electrode plates includes a number of cathode plates and a number of anode plates where the number of cathode plates is the same as the number of anode plates and two adjacent electrode plates having different polarities;
    a series of partitions, being disposed at an inner side of the top surface, having a quantity equal to that of the electrode plates, and extending to a predetermined length in a direction from the inner side of the top surface to the bottom surface, and arranged with an interval apart from each other in a direction from a side of the chamber to the other side of the chamber, wherein each partition corresponding with and being adjacent to each electrode plate, so that each electrode plate has an independent space and the interior of the chamber is an communicating space, wherein the predetermined length of the series of partitions is defined as a distance between an outer end of each partition and the bottom surface subtracted from a distance that the inner side of the top surface is spaced apart from the bottom surface;
    a communicating channel, formed by a side of each electrode plate not completely abutting an inner side of the bottom surface, and disposed between the inner side of the bottom surface and each electrode plate, wherein two corners are missing from an outer end of each electrode plate being adjacent to the bottom surface for forming the communicating channel;
    a liquid storage portion, formed by the space between a side of the series of partitions and a side of the chamber and communicating with the communicating channel, for accommodating the liquid;
    a gas extraction unit, comprising a plurality of first openings, a plurality of second openings, a first collection portion and a second collection portion;
    each of the plurality of first openings corresponding to the independent space of each cathode plate and disposed on the top surface;
    each of the plurality of second openings corresponding to the independent space of each anode plate and disposed on the top surface;
    the first collection portion, disposed on an outer side of the top surface, and communicated to each of the plurality of first openings, for collecting a gas generated by each cathode plate; and
    the second collection portion, disposed on the outer side of the top surface, and communicated to each of the plurality of second openings, for collecting a gas generated by each anode plate.

2. The electrolytic reactor of an oxyhydrogen machine according to claim 1, wherein the first collection portion and the second collection portion of the gas extraction unit are formed by a cover, a partition plate, a first collection hole and a second collection hole; the cover has an opening that covers onto an outer side of the top surface; the partition plate is disposed in the cover, for forming a first gas collection chamber and a second gas collection chamber which are not communicated to each other, and the first gas collection chamber corresponding to each of the plurality of first openings, and the second gas collection chamber corresponding to each of the plurality of second openings; the first collection hole penetrates through a lateral surface of the cover and corresponds to the first gas collection chamber; and the second collection hole penetrates through a lateral surface of the cover and corresponds to the second gas collection chamber.

3. The electrolytic reactor of an oxyhydrogen machine according to claim 2, further comprising an injection port, formed on the top surface and corresponding to the liquid storage portion for adding the liquid.

4. The electrolytic reactor of an oxyhydrogen machine according to claim 3, further comprising a liquid resupply mechanism and a sensing unit; the liquid resupply mechanism having a side communicating with the injection port; the sensing unit, being installed at the chamber and electrically coupled to the liquid resupply mechanism, for sensing the liquid level to transmit a message to the liquid resupply mechanism, the message being selected from a group consisting of adding the liquid into the chamber and not adding the liquid into the chamber.

5. The electrolytic reactor of an oxyhydrogen machine according to claim 2, further comprising a venting hole formed on the top surface and corresponding to the liquid storage portion.

6. The electrolytic reactor of an oxyhydrogen machine according to claim 2, further comprising a return pipeline system disposed on an outer side of the main body, and the return pipeline system comprising a fluid pipeline and a pump; the fluid pipeline having an end communicating with the liquid storage portion and the other end communicating with the communicating channel; and the pump being installed at the fluid pipeline, for pumping the liquid of the liquid storage portion into the communicating channel through the fluid pipeline.

7. The electrolytic reactor of an oxyhydrogen machine according to claim 6, wherein the pump has a transmission direction which is a one-way direction.

8. The electrolytic reactor of an oxyhydrogen machine according to claim 1, further comprising an injection port, formed on the top surface and corresponding to the liquid storage portion for adding the liquid.

9. The electrolytic reactor of an oxyhydrogen machine according to claim 8, further comprising a liquid resupply mechanism and a sensing unit; the liquid resupply mechanism having a side communicating with the injection port; the sensing unit, being installed at the chamber and electrically coupled to the liquid resupply mechanism, for sensing the liquid level to transmit a message to the liquid resupply mechanism, the message being selected from a group consisting of adding the liquid into the chamber and not adding the liquid into the chamber.

10. The electrolytic reactor of an oxyhydrogen machine according to claim 1, further comprising a venting hole formed on the top surface and corresponding to the liquid storage portion.

11. The electrolytic reactor of an oxyhydrogen machine according to claim 1, further comprising a return pipeline system disposed on an outer side of the main body, and the return pipeline system comprising a fluid pipeline and a pump; the fluid pipeline having an end communicating with the liquid storage portion and the other end communicating with the communicating channel; and the pump being installed at the fluid pipeline, for pumping the liquid of the liquid storage portion into the communicating channel through the fluid pipeline.

12. The electrolytic reactor of an oxyhydrogen machine according to claim 11, wherein the pump has a transmission direction which is a one-way direction.

* * * * *